Sept. 10, 1929.  R. B. FAGEOL  1,727,759
SPRING VEHICLE
Filed March 8, 1926  3 Sheets-Sheet 1

INVENTOR.
Rollie B. Fageol
BY
Townsend, Loftus & Abbett
ATTORNEYS.

Sept. 10, 1929.　　　R. B. FAGEOL　　　1,727,759
SPRING VEHICLE
Filed March 8, 1926　　　3 Sheets-Sheet 2
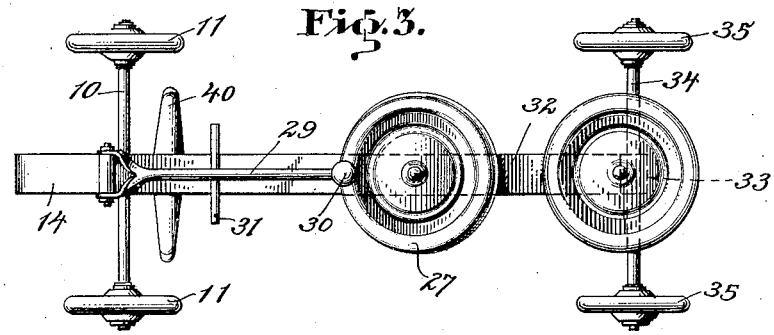
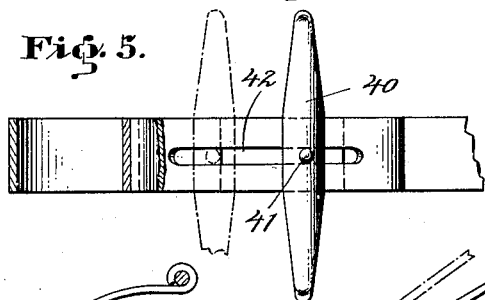
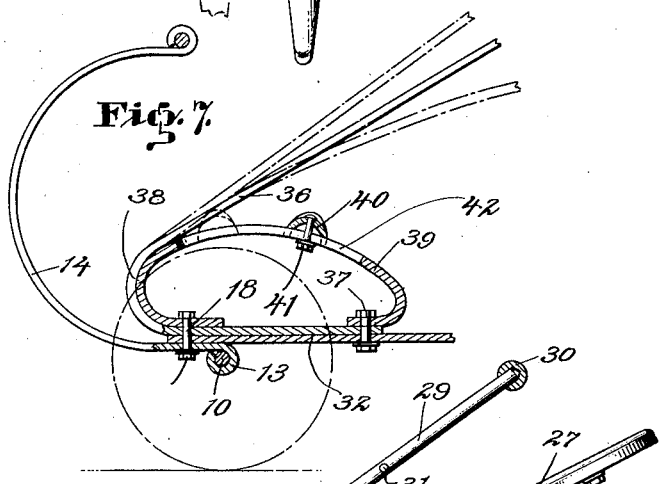
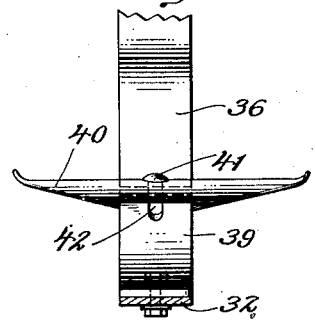
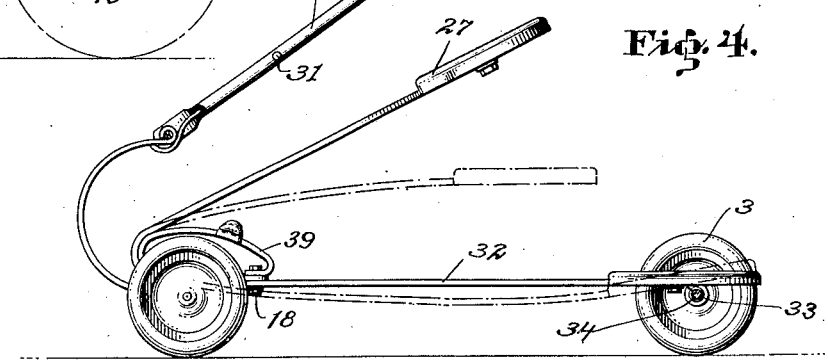
INVENTOR.
Rollie B. Fageol
BY Townsend, Loftin & Abbitt
ATTORNEYS.

Sept. 10, 1929.    R. B. FAGEOL    1,727,759
SPRING VEHICLE
Filed March 8, 1926    3 Sheets-Sheet 3

INVENTOR.
Rollie B. Fageol
BY
Townsend, Loftus & Abbett
ATTORNEYS.

Patented Sept. 10, 1929.

1,727,759

UNITED STATES PATENT OFFICE.

ROLLIE B. FAGEOL, OF LOS ANGELES, CALIFORNIA.

SPRING VEHICLE.

Application filed March 8, 1926. Serial No. 92,996.

This invention relates to a vehicle and particularly pertains to a child's vehicle commonly known as a "scooter."

It is the principal object of the present invention to provide an amusement device for children of the type commonly known as a "scooter" and which device will have a substantially all-resilient construction, whereby an entirely new and novel effect will be obtained in riding upon the vehicle, and propelling the same.

The present invention contemplates the provision of a running gear upon which a vertically resilient spring frame or bed is mounted. This spring frame also carries a resiliently mounted seat, a resilient steering means, and a propelling member.

The invention is illustrated by way of example in the accompanying drawings, in which:

Fig. 3 is a view in plan showing another form of the invention in which the running gear consists of two axles each carrying two wheels.

Fig. 4 is a view in side elevation showing the complete structure of the device in Fig. 3 and more particularly indicating by dotted lines flexed positions of the seat and its support, as well as the frame.

Fig. 5 is an enlarged fragmentary view in plan showing the foot rest and indicating by dotted lines the manner in which it may be adjusted.

Fig. 6 is a fragmentary view in front elevation showing the position of the foot rest on the frame member.

Fig. 7 is an enlarged fragmentary view of the forward end of the vehicle showing the manner in which the seat support flexes and the resilient fulcrum member upon which said support is mounted.

Figure 1:
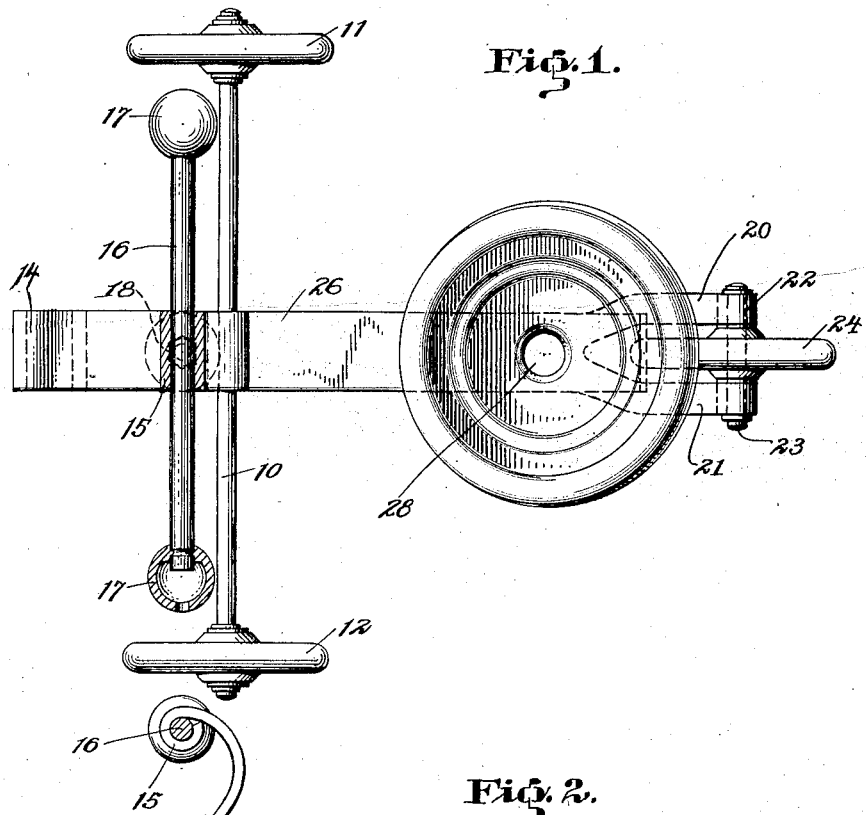
Fig. 1 is a view in plan showing one form of the present invention provided with a front axle carrying two wheels and a rear axle having one wheel centrally mounted thereon.
Figure 2:
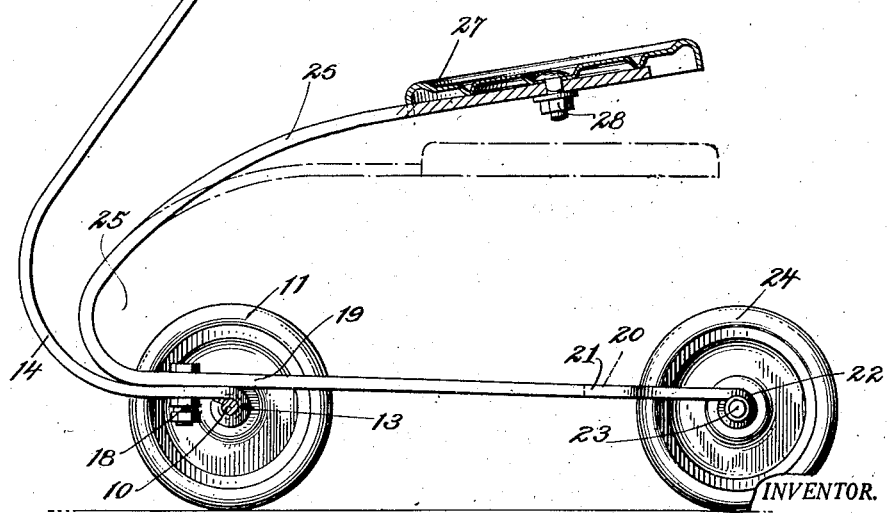
Fig. 2 is a view in side elevation showing the device of Fig. 1 and further indicating by dotted lines a position of the seat when the seat support has been flexed.

Referring more particularly to Figs. 1 and 2 of the drawings, it will be seen that 10 indicates a front axle upon which are mounted wheels 11 and 12. The axle 10 is relatively long as compared to the width of the remainder of the vehicle so that the widened tread of the wheels will give the vehicle stability. The axle is mounted in the eye 13 of a steering member 14. This steering member extends horizontally and forwardly from the axle 10 and curves upwardly in a goose-neck shape to terminate in an eye 15. This eye is a considerable distance above the level of the axle 10.

The eye 15 carries a transversely and horizontally extending steering bar 16, upon the opposite ends of which suitable knobs 17 are here shown. The steering bar 14 is of resilient material, such as spring steel of rectangular cross section and may be flexed under certain conditions. The horizontal portion of the steering bar 14 receives a king bolt 18 which passes downwardly through the bed member 19 of the vehicle and pivots the steering bar 14 to the underneath side of the bed in a manner to permit the axle 10 to be swung in a horizontal plane and the vehicle thus guided.

The bed member 19 as here shown is a spring bar of relatively narrow width. The rear terminating end of this bar is split and forms a fork, the arms of which are indicated at 20 and 21. These arms terminate in eyes 22 to receive a rear axle 23. A wheel 24 is mounted upon the rear axle between the arms of the fork. As shown in Figs. 1 and 2, the bed member or bar 19 is bent upon itself at a point forwardly of the front axle 10 and forms a loop 25. The bar continues upwardly and rearwardly to form a spring bar seat support 26, upon which a suitable seat 27 is mounted by a bolt 28 or other means.

By reference to Fig. 2 of the drawing, it will thus be seen that the spring bar 26 and its continuing portion 19 form a substantially U-shaped spring structure aligned in a vertical plane. It will further be evident that when weight is imposed upon the seat 27, the bar 26 will flex along its length and at the loop 25 to assume various positions, one of which is indicated by dotted lines in Fig. 2.

Referring to the structure of Figs. 3 to 6 inclusive, the vehicle is shown as comprising a front axle 10 passing through eye 13 of a looped resilient steering bar 14, at the loop end of which a tongue 29 is pivotally mounted for vertical swinging movement. This tongue may be fitted with a knob 30 at its end, as well as steering handles 31. The steering bar 14 is mounted with its horizontal end beneath the forward end of a resilient frame or bed bar 32. A king bolt 18 passes through the spring bar 14 as well as the bed bar and permits the vehicle to be steered by manipulation of the steering handle 29.

The bed bar 32 as shown in Fig. 4 is fitted at its rear end with a bearing 33, through which a rear axle 34 extends. This rear axle is substantially the same length as the front axle 10 and is fitted with a pair of wheels 35 at its outer ends. It will thus be evident that the structure shown in Fig. 3 is not liable to tip sideways and throw the occupant therefrom.

Secured to the forward end of the bed bar 32 is a spring seat bar 36. This seat bar is looped so that it has a portion secured to the upper face of the bed bar by the king bolt 18 and a bolt 37. The main portion of the seat bar extends upwardly and rearwardly at an angle to the horizontal and carries the seat 27 at its free end. The seat bar 36 is bent upon itself to form a loop 38 and mounted within this loop is a resilient fulcrum member 39. The fulcrum member is semi-circular in formation extending longitudinally of the bed bar 32, being secured at its forward end within the loop 38 by the king bolt 18 and at its rearmost end against the rear of the spring bar 36 by the bolt 37.

It will be evident that as weight is imposed upon the seat bar 36 to cause it to be flexed and downwardly pressed, the bar 36 will bend down upon the arcuate horizontal face of the fulcrum member 39 and will bear upon this face with progressive contact as the bar flexes. This fulcrum member thus prevents undue strain being imposed upon the bar at its loop, which might result in the breakage of the bar, and also adds yieldable resistance to the flexing of the bar, as the weight imposed upon the seat is gradually disposed upon the arcuate surface of the fulcrum member.

Another feature of convenience in the present structure is the provision of a foot rest 40 which is secured by a bolt 41 upon the fulcrum member 39. This bolt passes through a hole in the center of the foot rest and also through a slot 42 extending longitudinally of the fulcrum member so that the foot rest may be moved forwardly or rearwardly to become adjusted to the length of the legs of the person who intends to occupy the vehicle. Mounted over the rear axle of the vehicle and secured to the bed bar, as shown in Figs. 3 and 4, is a platform, upon which a person may stand while coasting, if desired.

In operation of either form of the invention or any modifications thereof, it will be evident that the entire vehicle structure will have a spring-board effect, since the manner in which the seat is supported will not alone cause a buoyant sensation to be given the rider, but the bed bar is also resilient, so that in riding over irregularities the device proves to be an amusing vehicle for chldren.

In operation, the device may be used as a simple "scooter", in which case the occupant merely stands on the bed member with one foot, pushing with the other to produce locomotion and guide with the steering means provided. After the vehicle has attained a suitable speed, the rider may then sit down upon the spring supported seat, place his feet on the foot rest 40 or the axle 10 and then coast.

It will thus be seen that the device here disclosed, while simple and economical in its construction, will afford an amusing and serviceable vehicle for children.

Figure 8:
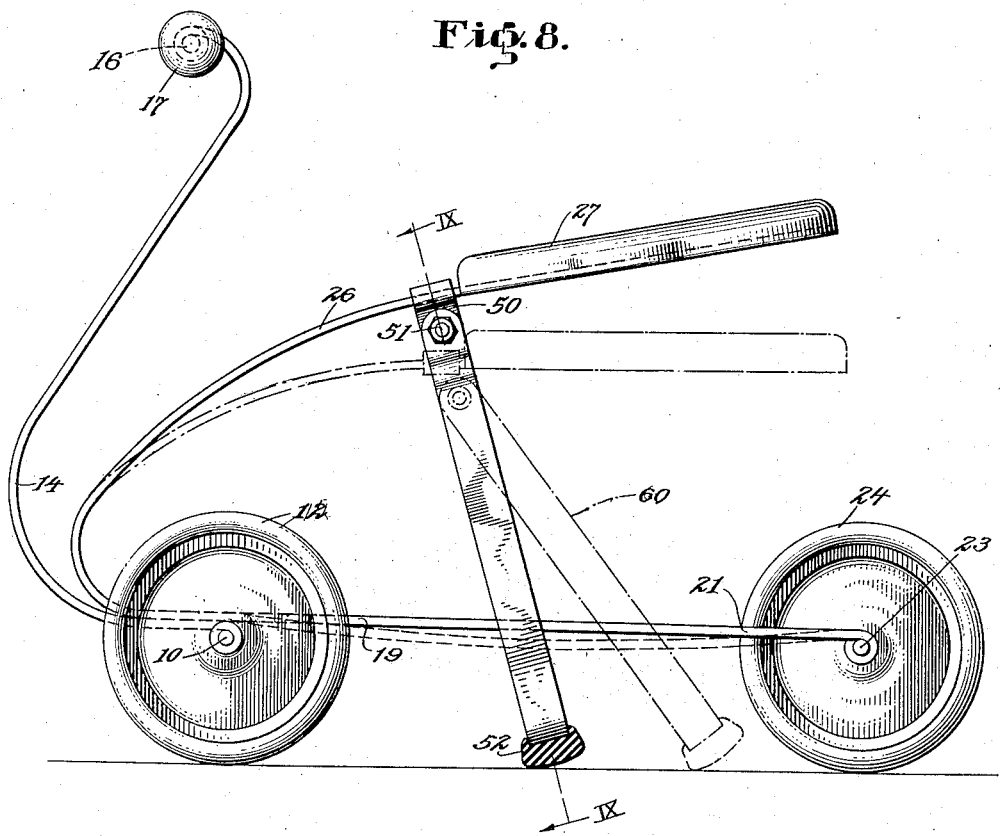
Fig. 8 is a side elevation of the vehicle shown in Figs. 1 and 2, this side elevation showing the attachment of one form of propelling mechanism.
Figure 9:
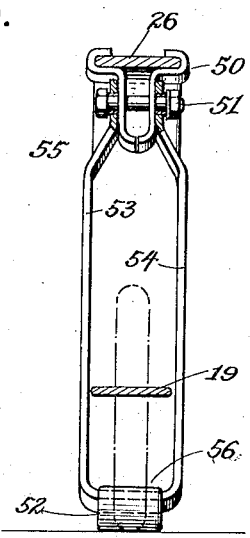
Fig. 9 is a vertical section taken on line IX—IX, Fig. 8.

In some instances it is desired to provide a propelling mechanism whereby forward motion may be imparted to the spring vehicle. Such a propelling mechanism is illustrated in Figs. 8 and 9, and the propelling mechanism may be attached either to the structure shown in Figs. 1 and 2 or the other structures illustrated. The propelling mechanism employed in the present instances consists of a bracket member or clip 50 which is secured to the spring bar 26 just forward of the seat 27.

Pivotally mounted to this bracket or clip as at 51 is a pusher bar as shown, on the lower end of which is mounted a rubber pad or foot 52.

The pusher bar consists of two downwardly extending leg members 53 and 54. The upper ends of these bars are pivoted on the bolt 51 and they are then spread out as indicated at 55 and separated so as to clear the bed member 19. The lower ends of the pusher bars 53 and 54 are connected as shown at 56 and this connection serves as a support or attachment for the foot member 52, this being preferably constructed of rubber so as to prevent slippage.

The propelling mechanism operates as follows: When the seat 27 and the spring bar 26 are unsprung as shown by full lines in Fig. 8 the pusher bars, together with the foot 52, will assume the full line position, but when the spring bar and seat 27 are depressed as indicated by dotted lines, the pusher bars 53 and 54 swing about the pivot 51 and assume the dotted line position shown at 60. The rubber foot engages the sidewalk or ground surface over which the "scooter" is traveling and as such pushes it forward each time the seat and spring bar are depressed.

While I have shown the preferred form of my invention as now known to me, it is to be understood that various changes may be made in its construction without departing from the spirit of the invention as defined in the appended claims.

Having thus described my invention, what I claim and desire to secure by Letters Patent is:

1. A child's vehicle of the class described comprising a running gear having front and rear axles, a bed for said vehicle comprising a vertically yielding resilient bar mounted at its opposite ends on said axles, a yieldable seat support carried by the forward end of said bar and supporting a seat above the bed for vertical springing movement, a seat carried thereupon, and a resilient steering bar carried by the bed for steering the vehicle.

2. A child's vehicle of the class described comprising a running gear consisting of front and rear axles, a vertically resilient bar forming the bed of the vehicle and mounted upon said running gear, a resilient seat support secured at the forward end of said bar and being bent to form a loop in a vertical plane, a seat carried upon the free end of said support, steering means connected with the front end and mounted adjacent the loop of the seat structure, and a fulcrum block disposed in the loop formed between the bed bar and the seat supporting portions of the structure and against which said seat support rests as it flexes.

3. A child's vehicle comprising a substantially horizontal resilient body bar upon which a person may stand, front and rear axles supporting the opposite ends of said body bar, steering means connected with the front axle and extending thereabove, a spring seat bar extending upwardly and rearwardly from a point adjacent to the front axle, a seat mounted upon the rear free end of said bar, and a standing platform secured to the body bar over the rear axle.

4. An amusement device comprising a resilient body bar capable of flexing vertically, supports for said body bar adjacent the opposite ends thereof, a resilient seat support connected to one end of said bar and disposed thereover in the same vertical plane, whereby flexure of the bar will produce vertical movement of the seat support, said seat support being bent back upon and over the body bar, a fulcrum block carried by the body bar and disposed adjacent to the point of connection with the seat support whereby the seat support will flex against the fulcrum block, and a seat mounted upon the free end of said supporting bar.

5. An amusement device comprising a resilient body bar capable of flexing vertically, supports for said body bar adjacent the opposite ends thereof, a resilient seat support connected to one end of said bar and disposed thereover in the same vertical plane, whereby flexure of the bar will produce vertical movement of the seat support, said seat support being bent back upon and over the body bar, a vertically resilient fulcrum block carried by the body bar and disposed adjacent to the point of connection with the seat support whereby the seat support will flex against the fulcrum block, and a seat mounted upon the free end of said supporting bar.

6. An amusement device comprising a vertically resilient bar, pivotal supports for the opposite ends thereof whereby said bar may flex vertically between said supports, a seat support formed as a continuation of said resilient bar and bent over upon the bar to form a loop beyond one of the bar supports and to extend rearwardly over the bar in substantially the same vertical plane therewith, and a resilient semicircular fulcrum block secured to the bar and positioned within the loop formed between the bar and the seat support whereby said seat support will flex against and along the curved face of said fulcrum member as it flexes.

7. An amusement device comprising a vertically resilient bar, pivotal supports for the opposite ends thereof whereby said bar may flex vertically between said supports, a seat support formed as a continuation of said resilient bar and bent over upon the bar to form a loop beyond one of the bar supports and to extend rearwardly over the bar in substantially the same vertical plane therewith, a resilient semicircular fulcrum block secured to the bar and positioned within the loop formed between the bar and the seat support whereby said seat support will flex against and along the curved face of said fulcrum member as it flexes, and a running gear carried by said pivotal supports.

8. An amusement device comprising a vertically resilient bar, pivotal supports for the opposite ends thereof whereby said bar may flex vertically between said supports, a seat support formed as a continuation of said resilient bar and bent over upon the bar to form a loop beyond one of the bar supports and to extend rearwardly over the bar in substantially the same vertical plane therewith, a resilient semicircular fulcrum block secured to the bar and positioned within the loop formed between the bar and the seat support whereby said seat support will flex against and along the curved face of said fulcrum member as it flexes, a running gear carried by said pivotal supports, and means extending above one end of the structure for steering the running gear.

9. An amusement device comprising a vertically resilient bar, pivotal supports for the opposite ends thereof whereby said bar may flex vertically between said supports, a seat support formed as a continuation of said resilient bar and bent over upon the bar to form a loop beyond one of the bar supports and to extend rearwardly over the bar in substantially the same vertical plane therewith, a resilient semicircular fulcrum block secured to the bar and positioned within the loop formed between the bar and the seat support whereby said seat support will flex against and along the curved face of said fulcrum member as it flexes, a running gear carried by said pivotal supports, means extending above one end of the structure for steering the running gear, and a platform secured upon the opposite end of the bar and upon which a person might stand.

10. A spring coaster vehicle having a single U-shaped spring member, a seat on the end of a leg of said member, a rear wheel on the end of the other leg, and a steering wheel support pivotally connected to the forward end of the U-shaped spring member.

11. A spring coaster vehicle comprising a single U-shaped spring member having a relatively long upper leg, and a seat on the free end of said upper leg disposed vertically above the rear portion of the vehicle.

ROLLIE B. FAGEOL.